May 29, 1956  D. H. KIMBERLING  2,748,294
SPEED CONTROL APPARATUS
Filed June 8, 1954  2 Sheets-Sheet 1
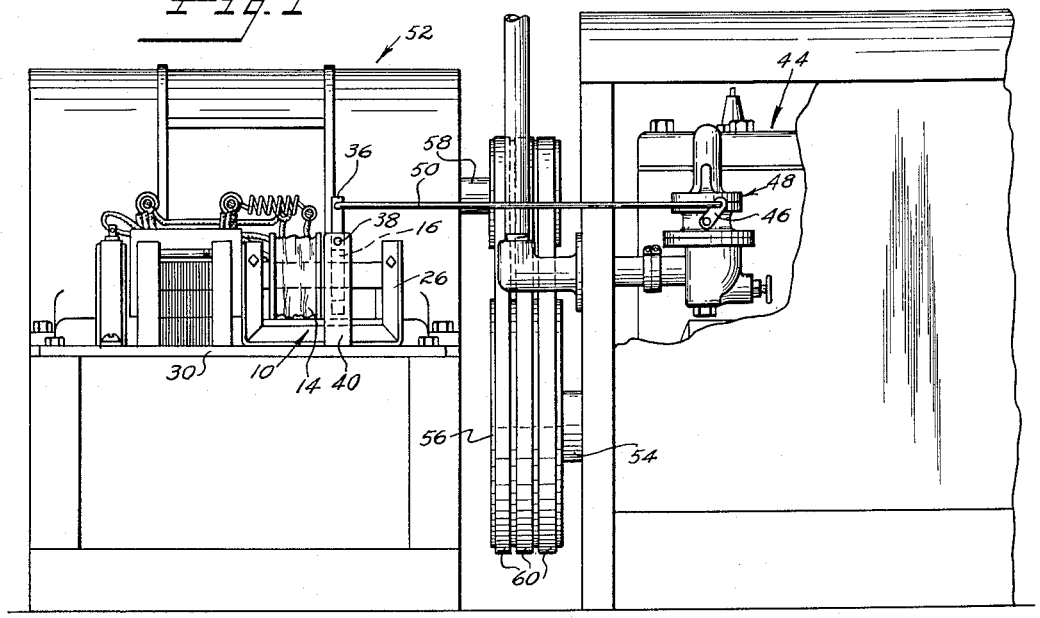
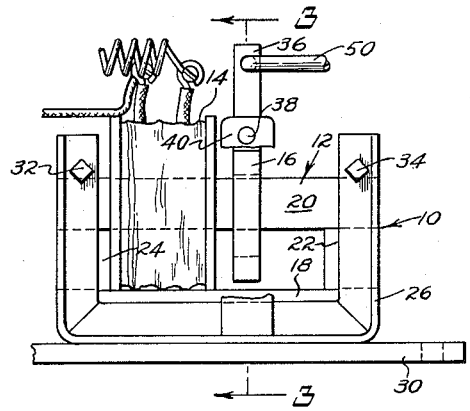
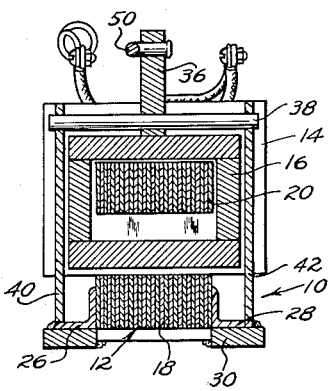
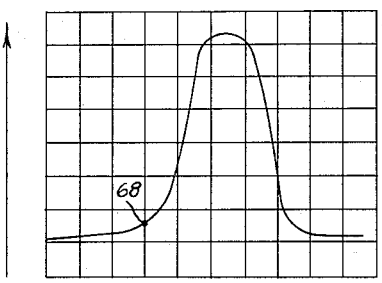
INVENTOR
DELMER H. KIMBERLING
BY Strauch, Nolan & Diggins
ATTORNEYS May 29, 1956

D. H. KIMBERLING 2,748,294

SPEED CONTROL APPARATUS

Filed June 8, 1954

INVENTOR

DELMER H. KIMBERLING

BY Strauch, Nolan & Diggins

ATTORNEYS

United States Patent Office 2,748,294
Patented May 29, 1956

2,748,294

SPEED CONTROL APPARATUS

Delmer H. Kimberling, Holdrege, Nebr., assignor to All-mand Brothers Manufacturing Company, Holdrege, Nebr., a partnership Application June 8, 1954, Serial No. 435,193

7 Claims. (Cl. 290—40)

This invention relates to control mechanism, and more particularly to control devices for automatically governing the operation of prime movers. The governing devices of the prior art fall into one of two classifications, those that are structurally simple but which are relatively insensitive in their control and those which while accurate in their control are extremely complex structurally.

It is accordingly the primary object of this invention to provide an improved device for governing the operation of a prime mover which is accurate in its controls and which, having structural simplicity, is inexpensive to manufacture.

It is an object of this invention to provide an improved governor for so controlling the operation of a prime mover that a selected operating function of an alternator or generator driven thereby will be automatically maintained at a predetermined operating value.

An object of this invention is to provide means for controlling the operation of a prime mover driven alternator comprising a governor having means for producing a magnetic field proportional in magnitude to an operating function of the alternator and means responsive to the magnitude of the magnetic field for controlling the operation of the prime mover.

It is a further object of this invention to provide a governor for controlling the operation of a coupled prime mover driven alternator comprising a fixed inductive means connected to the output of the alternator and adapted to establish a magnetic field proportional to the output of the alternator, and a movable coil inductively coupled to the fixed coil and adapted to actuate the throttle valve controlling the prime mover in accordance with its movement.

It is a further object of this invention to provide a control mechanism for a prime mover driven alternator for maintaining an operating characteristic of the alternator at a predetermined norm by modifying the operation of the prime mover comprising a pair of mutually interacting inductive elements, one fixed and electrically connected to the generator, the other comprising a short circuited coil mounted for pivotal movement relative to the fixed one of said inductive elements to a position indicative of the strength of the field, and having means actuated in response to movement of said movable inductive element for controlling the prime mover.

These and other objects of this invention will become apparent as the detailed description of the invention proceeds in connection with the accompanying drawings wherein like reference numerals have been used for designating like parts and wherein:

Figure 1 is an elevation view of a coupled prime mover and alternator unit showing the mechanical relationship of the governor to the prime mover;

Figure 2 is a side elevation of the governor mechanism;

Figure 3 is a sectional view of the governor mechanism taken along the line 3—3 of Figure 2;

Figure 6 is a graph showing the relationship of the current flowing in the fixed coil of the governor mechanism to the alternator output frequency;

Figure 4:
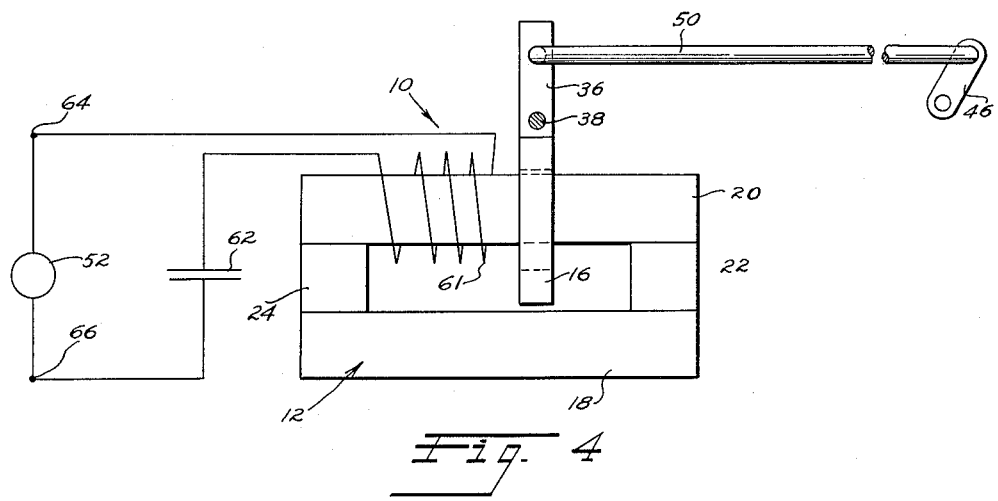
Figure 4 is a diagrammatic view of the governor mechanism adapted to maintain the alternator output frequency constant.

The structure of the improved control mechanism or governor 10 of this invention, which is shown in Figures 2 and 3, comprises a hollow laminated iron core structure 12 preferably rectangular in shape, a fixed inductive element 14 and a movable inductive element disclosed as ring or short circuited coil 16. The core structure 12 is formed with spaced parallel legs 18 and 20 interconnected at their respective ends by yoke members 22 and 24. This core structure 12 is mounted between a pair of U-shaped brackets 26 and 28 which are secured to the base plate structure 30 and the arms of which are tightened against the core structure 12 by bolts 32 and 34 to form a rigid assembly.

Inductive element 14 surrounds leg 20 and is fixed thereto at the end adjacent yoke 24. Movable ring 16, which is formed of four copper bars, suitably fixed together at their ends as by brazing to form a hollow rectangular short circuited coil of high current carrying capacity surrounds leg 20 of the core structure and is pivotally mounted adjacent inductive element 14. An arm 36, which is fixed centrally to the top bar of ring 16, is pivotally mounted on a transversely extending shaft 38 to permit movement of coil 16 toward and from inductive element 14. Shaft 38 is supported by and fixed to a pair of uprights 40 and 42 which are fixed to the base plate structure 30.

If an alternating current is applied to the fixed inductive element 14, a magnetic field will be set up which will induce an opposing magnetic field in the ring 16. The opposition of these two fields will cause freely pivoted ring 16 to pivot about shaft 38 in a counterclockwise direction, as viewed in Figure 2, from its normal position as shown. The normal position of ring 16 is determined either by its own weight or by springs provided to hold it in the desired position in the absence of a magnetic field. By varying the strength of the opposing magnetic fields, ring 16 may be caused to assume different positions about its pivot shaft 38.

In order to utilize this mode of operation of the governor 10 to control the operation of a prime mover driven generator, it is merely necessary to mechanically connect the arm 36 of ring 16 to actuate the throttle valve of the prime mover and to provide means for modifying the strength of the opposing magnetic fields sufficiently in accordance with variations of the selected generator operating characteristic from the predetermined norm to produce the necessary compensating movement of ring 16 to restore the desired operating characteristic under varying loads.

In Figure 1, the governor 10 is shown as utilized to control the operation of an internal combustion engine 44. It will be understood that this mechanism is equally well adapted to control the operation of any other prime mover. For this purpose, the arm 36 of ring 16 is connected to the control lever 46 of the throttle valve assembly 48 of the engine 44 by a connecting rod 50. Engine 44 is loaded by an alternator 52, the output shaft 54 of engine 44 being provided with a fly wheel 56 and being connected to the input shaft 58 of alternator 52 by suitable drive belts 60. Alternator 52 may be, although it need not be, of the type disclosed in co-pending application Serial No. 82,128, filed March 18, 1949, by Allmand et al. for an Electric Generator, now abandoned.

Figure 5:
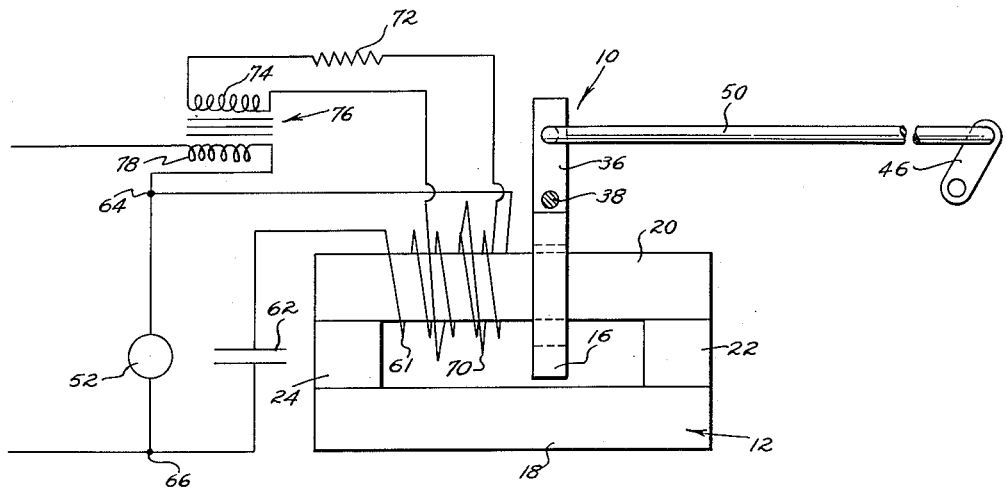
Figure 5 is a diagrammatic view of the governor mechanism adapted to maintain the alternator output voltage or, by interchange of connections current constant.

As is shown in Figures 4 and 5, the output generator 52 is connected to the governor 10 to control the movement of the coil 16. The circuit shown in Figure 4 is adapted to maintain the speed of the prime mover and the driven alternator substantially constant despite variations in the external load placed thereon. When connected to control a prime mover in this way the fixed inductive element 14 of the governor 10 comprises a single coil 61 connected in series with capacitor 62. Capacitor 62 and coil 61 are of such values that the resonant frequency of these two elements when connected in series is nearly the output frequency of the alternator 52 corresponding to the speed of the prime mover 44 that it is desired to maintain.

If the "Q" of this circuit is reasonably high, ten or better for example, the current resonance curve for coil 61 will be quite steep as shown in Figure 6. Little current will flow in coil 61 until the frequency of the alternator 52 reaches some point such as 68. Beyond that point, the current in coil 61 will rise very rapidly so that ring 16 will be repelled by coil 61 pivoting in a counterclockwise direction about shaft 38. Lever 46 of the throttle valve, which as shown is in the fully open position of the valve, will be caused to pivot in a counterclockwise direction to tend to close the valve and to reduce the speed of the prime mover. Thus under a no load condition, the ring 16 and lever 46 will assume operating positions such that the frequency of alternator 52 is slightly below the exact resonant frequency of the circuit including coil 61 and capacitor 62. Due to the slight inertia of the elements of this control mechanism, a stable operating condition will be assumed with substantially no hunting.

If the prime mover is loaded, as for example by placing an external load upon the alternator 52, the speed of alternator 52 and its output voltage across terminals 64 and 66 will tend to reduce. The reduction in speed of the alternator will cause the frequency to drop from the stable point of operation near resonance. Ring 16 will be deflected less due to the decrease in both the voltage and the frequency applied. In this manner the throttle valve will be opened to accommodate for the increase in load. As before ring 16 and lever 46 will assume a stable operating position in which the speed of the engine is sufficient to drive the alternator at the selected operating frequency near the resonant frequency of coil 61 and capacitor 62. The newly assumed operating positions of these members will be closer to their fully open position than that previously assumed under no load operating conditions, the change of position of ring 16 after the operating frequency is restored being due to the decrease in the voltage applied from terminals 64 and 66. In this manner the operating speed of the prime mover and the frequency of the alternator is maintained substantially constant over wide load variations.

In certain types of alternators which have poor or substantially no regulation, in order to maintain the output voltage constant under varying loads, it is necessary to modify the speed of the alternator to compensate for such load variations. An alternator of this type is that disclosed in the aforesaid co-pending application of Allmand et al. The circuit shown in Figure 5 is adapted for this purpose.

This circuit of Figure 5 is basically the same as that of Figure 4 in that coil 61 of inductive element 14 and capacitor 62 are connected in series across the output terminals 64 and 66 of the generator 52.

In order to control the movement of ring 16 so that the speed of generator 52 will be increased in response to increases in load, certain additional circuit components must be added to modify the movement of ring 16 in accordance with load changes. For this purpose inductive element 14 includes in addition a second coil 70 which is wound upon leg 20 of the core structure 12 of the governor 10 in intimate association with coil 61. This coil 70, a resistor 72, and the secondary winding 74 of a transformer 76 are connected to form a series circuit as shown. The primary winding 78 of transformer 76 is connected in series with the load on the generator 52. For the purposes of voltage regulation, these additional circuit components are so connected that the magnetic field produced by coil 70 is in opposition to that produced by coil 61, the relation of these voltages being shown vectorially in Figure 7, vector $E_{52}$ representing the output voltage of alternator 52, $E_{61}$ the voltage of coil 61, and $E_{70}$ the voltage of coil 70. The angle 80 indicates the range of phase shift of vector $E_{70}$ due to the movement of ring 16.

The effect upon the action of the governor 10 of these additional components is two-fold. Since any output from the alternator 52 must pass through the winding 78 of transformer 76, the impedance of winding 74 with respect to coil 70 will be decreased as the load increases. Since coil 70, resistor 72, and winding 74 are connected in series and since coil 70 is inductively associated with coil 61 to absorb energy therefrom, a change of impedance of the winding 74 will change the impedance of coil 14 and as a consequence the series resonant frequency of capacitor 62 and coil 61. Also, since the voltage induced in winding 74 due to the current flowing in winding 78 is applied to coil 70, the magnetic field produced by the flow of current through coil 70 due to this voltage will be proportional to current flowing through winding 78, and therefore to the load upon the alternator 52.

The opposition of the magnetic fields of coils 61 and 70 and the change of resonant frequency of coil 61 and capacitor 62 in response to changes in current load upon the alternator 52 combine in their effect on the action of ring 16 so that an increase in load upon the generator 52 will produce less deflection of ring 16 and thereby open the throttle valve of the prime mover. Thus if the load is increased, ring 16 will move to a new stable position nearer the vertical position as shown in which the throttle valve has opened sufficiently to increase the speed of the alternator to a point at which the output voltage is restored to the predetermined operating lever. Conversely a decrease in load upon the generator will produce an increase in deflection of ring 16, a closing of the throttle valve, and a reduction of the speed of the alternator to a point at which the operating output voltage is restored.

Figure 7A:
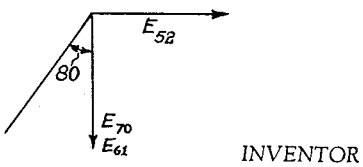
Figure 7a is a vector diagram showing the voltage $E_{61}$ in phase with the voltage $E_{70}$.
Figure 7:
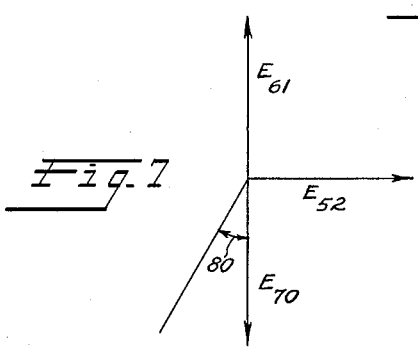
Figure 7 is a vector diagram showing the phase relationship of the voltages induced in the opposing coils of the governor mechanism, as modified in Figure 5, to the alternator voltage.

If it is desired to maintain a constant output current, it is merely necessary to reverse the connections so that the magnetic fields produced by coils 61 and 70 are additive in effect. This would produce a 180° shift of the vector $E_{61}$ in Figure 7 as shown in Figure 7a. This may be done conveniently by reversing the connections to coil 61.

When connected for current regulation, an increase in output current will react upon the ring 16 such that its deflection is increased, so that the throttle valve will move toward its closed position and the speed of the generators reduced.

It is thus seen that the applicant has developed a governor for controlling the operation of a prime mover driving a generator which is readily adapted for controlling the output frequency, voltage, or current of the generator over wide ranges of load variation. This application is a continuation-in-part of my application Serial No. 210,490, filed February 12, 1951, now abandoned.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In the combination of a prime mover and throttle means for controlling the operation thereof with a means for producing an alternating current signal of a frequency proportional to the speed of said prime mover, a resonant circuit connected for excitation by said signal producing means, said resonant circuit including a capacitor and an inductance and having a resonant frequency which is approximately equal to the frequency of the signal produced by said signal producing means under a predetermined load condition of said prime mover, and means responsive to the strength of the magnetic field produced by said inductance for controlling said throttling means.

2. In the combination of a prime mover and throttle means for controlling the operation thereof with means for producing an alternating current signal of a frequency proportional to the speed of said prime mover, a resonant circuit connected for excitation by said signal producing means, said resonant circuit including a capacitor and an inductance and having normal resonant frequency which is approximately equal to the frequency of said signal produced by said signal producing means under a predetermined load condition of said prime mover, means responsive to the strength of the magnetic field produced by said inductance for controlling said throttling means, and means responsive to variations in the load on said prime mover for varying the strength of the effective magnetic field of said inductance.

3. In the combination of a prime mover and throttle means for controlling the operation thereof with means for producing an alternating current signal of a frequency proportional to the speed of said prime mover, a resonant circuit connected for excitation by said signal producing means, said resonant circuit including a capacitor and an inductance and having a resonant frequency which is approximately equal to the frequency of the signal produced by said signal producing means under a predetermined load condition of said prime mover, means responsive to the strength of the magnetic field produced by said inductance for controlling said throttling means, and means responsive to variations in the load on said prime mover for varying the strength of the effective magnetic field of said inductance said last named means comprising a second inductance disposed in the magnetic field of the first said inductance, and means for inducing an alternating signal in said second inductance proportional to the load on said prime mover.

4. In the combination of an alternator with a prime mover drivingly connected thereto and a throttling means for said prime mover, a governor interconnecting said alternator and said throttling means to actuate the latter to compensate for variations in load upon the former comprising a capacitor and an inductance having a resonant frequency substantially equal to the predetermined no load operating frequency of said alternator, said inductance and said capacitor being so electrically connected for excitation by said alternator that said inductance produces a magnetic field of variable magnitude dependent upon the load upon said alternator, a short circuited coil inductively coupled to said inductance, means mounting said coil for pivotal movement about an axis, the position of said coil about its pivot axis being dependent upon the strength of the magnetic field, and motion transmitting means interconnecting said coil and throttling means.

5. The combination defined in claim 3 wherein said second inductance is so related to said first inductance and so connected to said means for inducing an alternating signal in said second inductance that the field produced by said second inductance is additive in effect to that produced by said first inductance.

6. The combination defined in claim 3 wherein said second inductance is so related to said first inductance and so connected to said means for inducing an alternating signal in said second inductance that the field produced by said second inductance is subtractive in effect to that produced by said first inductace.

7. In the combination of an alternator with a prime mover drivingly connected thereto and a throttling means for said prime mover, a governor interconnecting said alternator and said throttling means to actuate the latter to compensate for variations in load upon the former comprising a capacitor and inductance having a resonant frequency substantially equal to the predetermined no-load operating frequency of said alternator, said inductance and said capacitor being so electrically connected for excitation by said alternator that said inductance produces a magnetic field of variable magnitude dependent upon the load upon said alternator, a short circuited coil inductively coupled to said inductance, means mounting said coil for pivotal movement about an axis, the position of said coil about its pivot axis being dependent upon the strength of the magnetic field, motion transmitting means interconnecting said coils and throttling means, and a third inductance associated with said first inductance, and means responsive to the load upon said alternator and connected to said third inductance for establishing an alternating current therein effective to produce a magnetic field superimposed upon that of said first inductance to thereby modify the resultant magnetic field acting upon said second inductance.

References Cited in the file of this patent

UNITED STATES PATENTS

| 502,788 | Thomson | Aug. 8, 1893 |
| 661,222 | Mershon | Nov. 6, 1900 |
| 885,400 | Szuk et al. | Apr. 21, 1908 |
| 928,531 | McCarthy | July 20, 1909 |
| 1,066,081 | Coleman | July 1, 1913 |
| 1,245,823 | Tompkins | Nov. 6, 1917 |
| 1,351,027 | Davis et al. | Aug. 31, 1920 |
| 1,505,853 | Brainard | Aug. 19, 1924 |
| 1,612,351 | Boddie | Dec. 28, 1926 |
| 1,718,336 | Davis | June 25, 1929 |
| 1,948,591 | Morgan | Feb. 27, 1934 |
| 1,970,333 | Muehter | Aug. 14, 1934 |
| 2,461,493 | Clentimack | Feb. 8, 1949 |
| 2,558,729 | Buechler | July 3, 1951 |

FOREIGN PATENTS

| 230,540 | Germany | Aug. 4, 1909 |